Nov. 23, 1926. 1,608,069

A. H. LACEY ET AL

VEHICLE RUNNING GEAR AND DRIVING MECHANISM

Filed Feb. 16, 1925 4 Sheets-Sheet 1

INVENTORS
Arthur H. Lacey
Columbia M. Crosson
BY
their ATTORNEYS

Nov. 23, 1926.  1,608,069
A. H. LACEY ET AL
VEHICLE RUNNING GEAR AND DRIVING MECHANISM
Filed Feb. 16, 1925    4 Sheets-Sheet 2
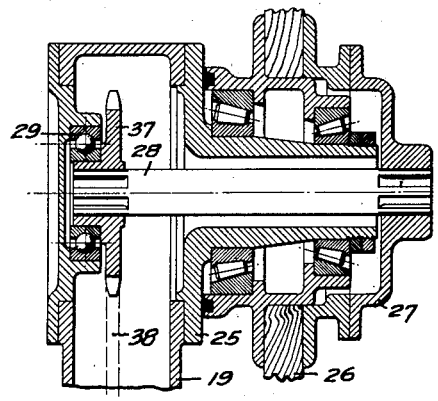
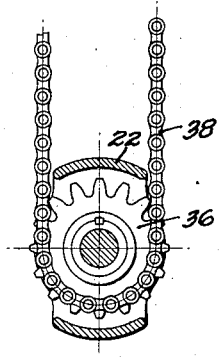
FIG.4.
FIG.3.
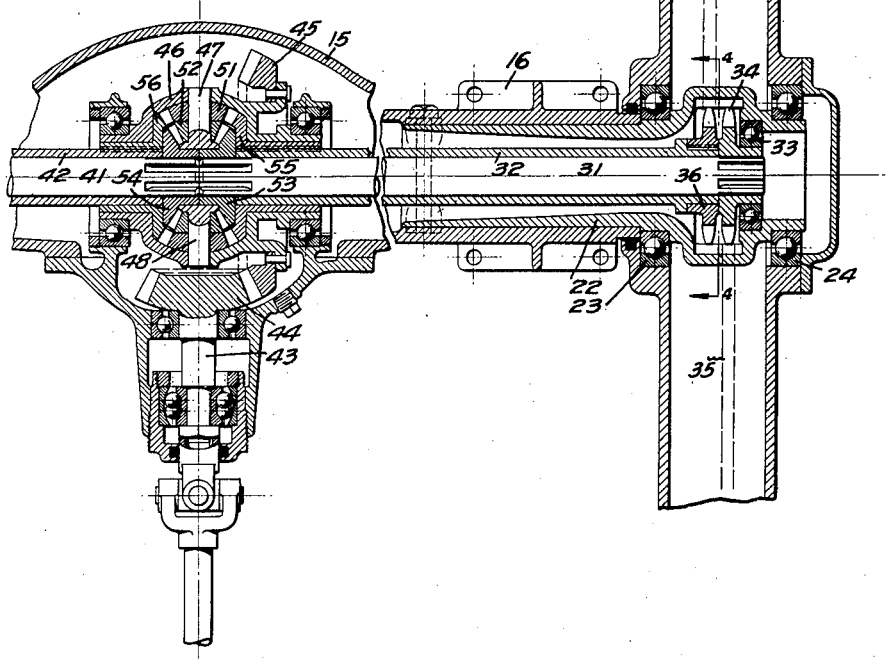
INVENTORS
Arthur H. Lacey
BY Columbia M. Crosson
White Prost & Evans
their ATTORNEYS.

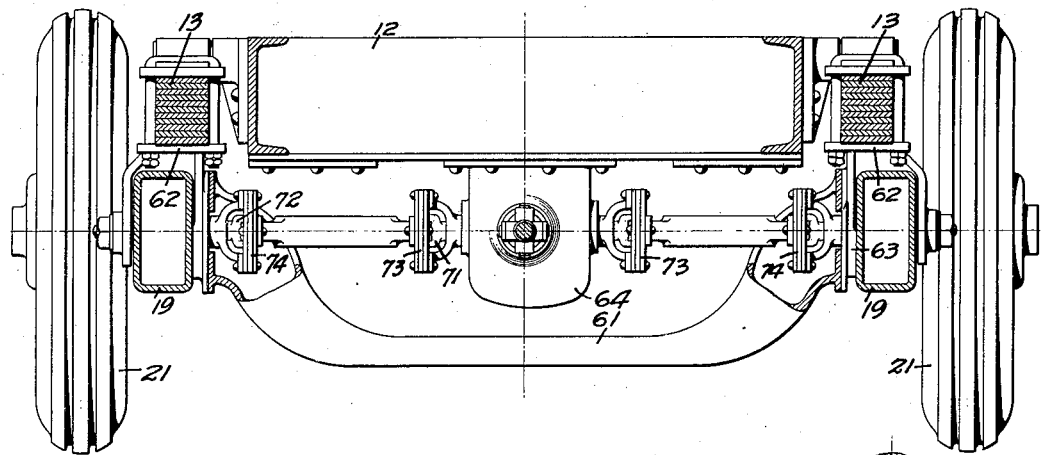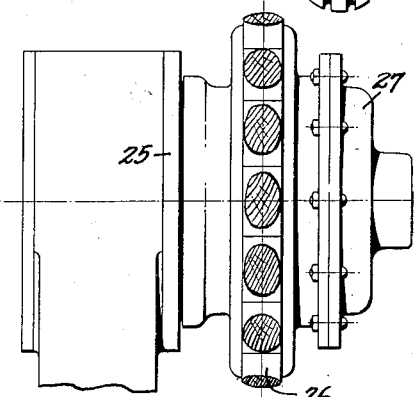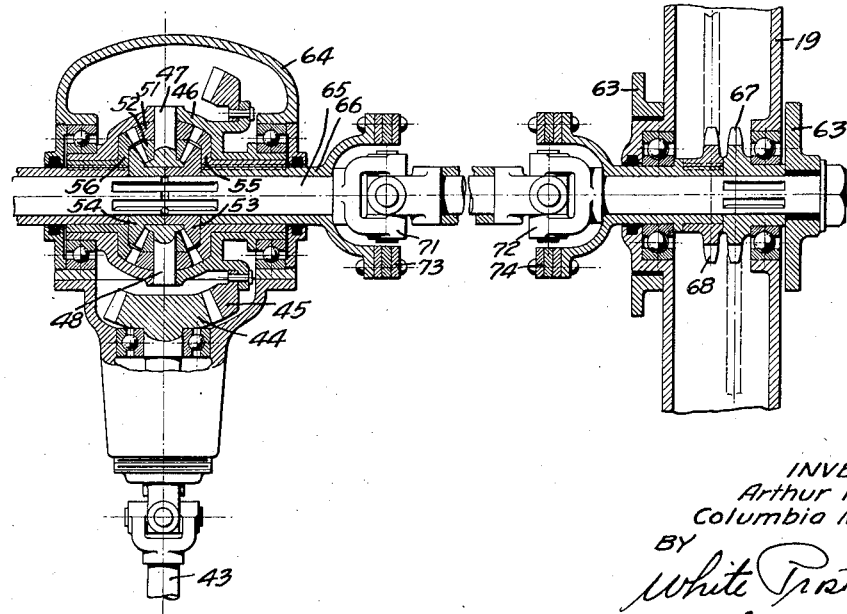

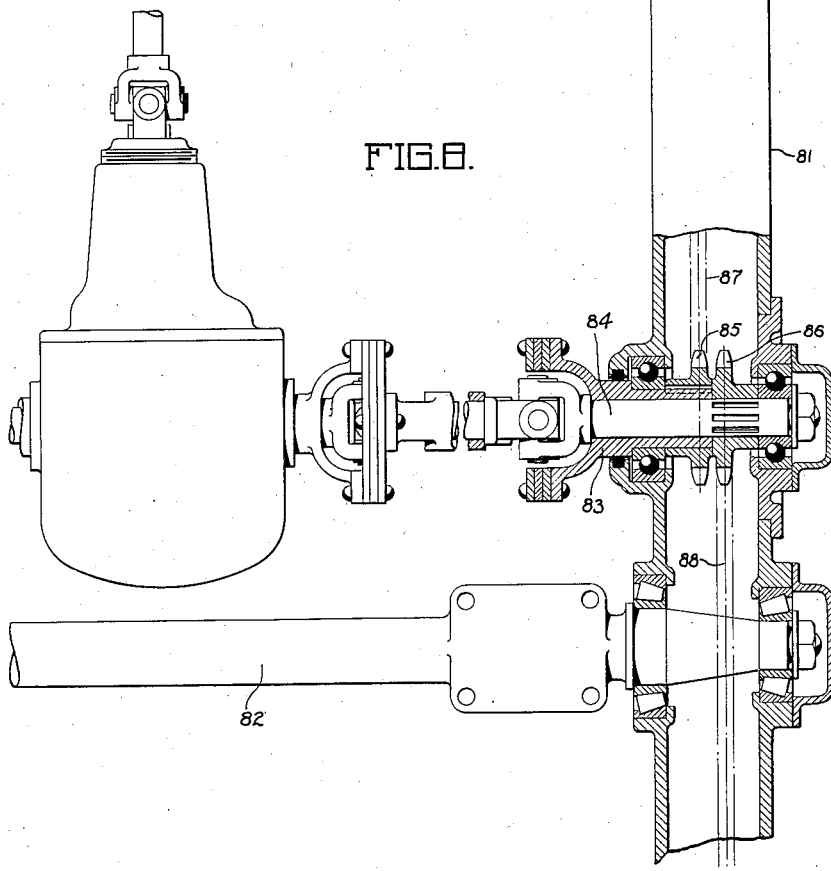

Patented Nov. 23, 1926.

1,608,069

UNITED STATES PATENT OFFICE.

ARTHUR H. LACEY AND COLUMBIA MONROE CROSSON, OF OAKLAND, CALIFORNIA.

VEHICLE RUNNING GEAR AND DRIVING MECHANISM.

Application filed February 16, 1925. Serial No. 9,388.

The invention relates to road vehicles and particularly to the running gear and driving mechanism thereof.

An object of the invention is to provide a mounting and a driving mechanism for four driving wheels of a power propelled vehicle.

Another object of the invention is to provide a four wheel running gear which will cause a minimum transmission of road shocks to the vehicle frame.

Another object of the invention is to provide means for differentially driving the four driving wheels of the vehicle through a single differential unit.

Another object of the invention is to provide a four wheel driving mechanism in which a single axle housing is employed, in combination with means for differentially driving the four wheels.

The invention possesses other advantageous features, some of which with the foregoing will be set forth at length in the following description, where we shall outline in full that form of our invention which we have selected for illustration in the drawings accompanying and forming part of the present specification. In said drawings we have shown one form of apparatus embodying our invention, but it is to be understood that we do not limit ourselves to such form, since the invention, as set forth in the claims, may be embodied in a plurality of forms.

Referring to said drawings:

Figure 3 is a horizontal section through the driving gear on one side of the vehicle, portions thereof being broken away to reduce the size of the figure.

Figure 4 is a section taken on the line 4—4 Figure 3.

Figure 5 is a transverse section of a vehicle provided with a modified form of running gear and driving mechanism.

Figure 6 is a horizontal section through the driving gear of the vehicle shown in Figure 5, portions thereof being broken away to reduce the size of the figure.

Figure 7 is a side elevation of a modified form of construction in which the drive axles are displaced from the vertical plane of the axis of pivot of the equalizing beams.

Figure 8 is a partial longitudinal section of the drive axles and equalizing beam arrangement shown in Figure 7.

Figure 1:
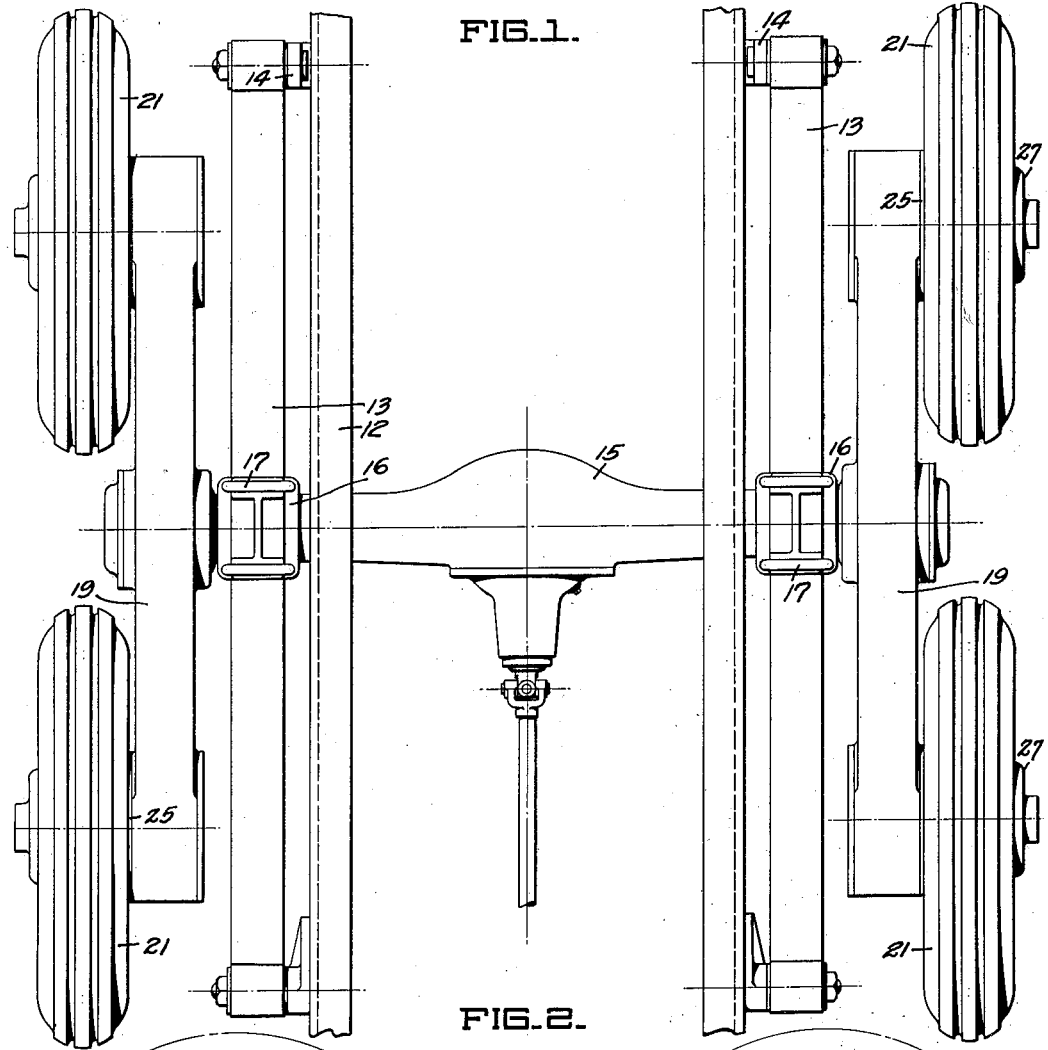
Figure 1 is a top or plan view of the rear end of a vehicle frame provided with the running gear and driving mechanism of our invention.
Figure 2:
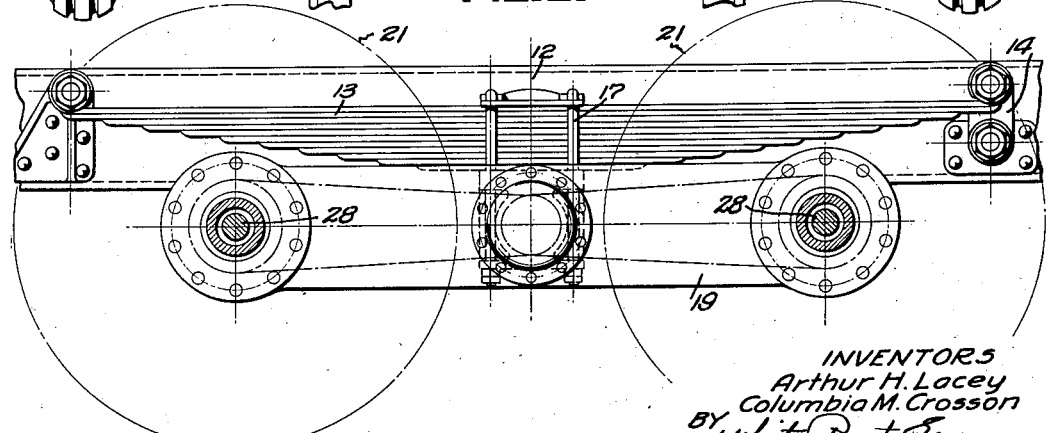
Figure 2 is a side elevation, partly in section, of the running gear and driving mechanism shown in Figure 1.

Our invention relates to a road vehicle and particularly to a road vehicle of the type having four driving wheels, the wheels being arranged in pairs with one pair on each side of the vehicle. The invention relates particularly to the means for driving the four wheels and the connection between the wheels and vehicle frame. The wheels are arranged in pairs on opposite sides of the vehicle and each pair of wheels is mounted so as to be independently movable with respect to the other pair, as the vehicle travels over rough and uneven roads. Each of the four wheels is differentially driven, so that excessive wear of the tires is not produced, and so that wear of the driving mechanism is reduced to a minimum.

Arranged at each side of the vehicle frame 12 is a long leaf spring 13, the spring being pivoted to the frame at one end and connected thereto at the other end by the shackle 14. Extending transversely across the frame, and usually below the frame, is a rigid transverse member, in the present instance comprising a drive axle housing 15. This housing is provided adjacent its ends with saddles 16 to which the springs 13 are clamped by the bolts 17. The axle housing 15 is disposed intermediate the ends of the spring 13 and preferably at the center thereof. The rigid transverse member 15, other than acting as an axle housing, serves to prevent torsion in the spring 13. Journaled on each end of the axle housing 15, is an equalizing beam 19, which is preferably fulcrumed at its center on the axle housing. The beam 19 is preferably rigid, and is normally parallel or substantially parallel with the frame 12. An equalizing beam 19 is fulcrumed on each side of the vehicle frame, and these beams are independently movable about their fulcrums, so that the wheels 21, which are mounted on the ends of the beams, may cause independent oscillations of the beams as the wheels travel over a rough uneven road.

The equalizing beam 19, which is formed of metal, is preferably hollow and contains the driving means for the wheels. Fitting squarely against the inner or bottom wall of the said socket. The operator then uses a hammer, striking the outer plug in the direction of the length of the axle whereby the wheel is jarred loose from the axle and the key thereof and may be quickly removed.

Having described the invention what is claimed is—

A device adapted to be used for removing a wheel from an axle upon which it is keyed comprising a body provided at its opposite ends with alined sockets of different sizes, and anvil plugs fitting in the sockets.

In testimony whereof I affix my signature.

CASH A. CLEMONS.

respect to the frame, due to the interposition of the springs 13, each drive shaft is provided with two universal joints. The drive shaft 65 is provided with two universal joints 71 and 72 and the hollow drive shaft 66 is provided with two universal joints 73 and 74, which latter joints are preferably of the fabric type. The joints 73 and 74 surround and are alined with the joints 71 and 72, so that power may be efficiently transmitted by the shaft to the sprockets 67 and 68. The drive shafts 65 and 66 are also preferably provided with slip joints to compensate for varying distance between the differential housing 64 and the brackets 63, due to the vertical movement of the brackets with respect to the differential housing.

In Figures 7 and 8 we have shown a modified form of construction in which the concentric driving shafts are disposed in front of the load carrying axle. The equalizing beam 81 is fulcrumed on the transverse member or load carrying axle 82, which is connected to the vehicle frame by springs, in the same manner as the transverse member 61, shown in Figure 5. The driving axles 83—84 are journaled at their outer ends in the hollow equalizing beam 81, the drive axles being concentric as heretofore set forth. The drive axles are flexible and are displaced longitudinally from the transverse member, in the present instance, being positioned in front of the transverse member. The two axles are provided on their ends, in each beam, with sprockets 85—86, which are connected by chains 87—88, with the driving axles of the wheels, as heretofore set forth. This construction discloses that it is not essential for the drive shafts to be concentric with the axis of fulcrum of the equalizing beams.

Our construction provides a very easy riding running gear, in which each of the four wheels is independently movable in passing over an obstruction, so that the amount of road shock transferred to the vehicle frame is reduced to a minimum. Furthermore, any wheel may rise or fall without having any effect on the position or direction of rotation of any other wheel. While we have shown the vehicle provided with long, substantially flat leaf springs, connected at their ends to the vehicle frame, it is to be understood that our invention contemplates the use of other forms of spring suspension.

We claim:

1. A vehicle driving unit comprising a rigid transverse member, an equalizing beam pivoted on each end of said transverse member, wheels journaled on the ends of said beams, two concentric drive axles concentric with the pivotal axis of each beam, means connecting one drive axle with one wheel on a beam and means connecting the other drive axle with the other wheel on the beam.

2. A vehicle driving unit comprising a rigid transverse member, equalizing beams pivoted intermediate their ends on the ends of the transverse member, a wheel journaled on each end of each equalizing beam, a drive axle for each wheel, said drive axles being mounted in concentric pairs, means connecting the drive axles to the respective wheels, a driving shaft and a double differential interposed between the driving shaft and the four drive axles.

3. A vehicle driving unit comprising a rigid transverse member, equalizing beams pivoted intermediate their ends on the ends of the transverse member, a wheel journaled on each end of each equalizing beam, two concentric drive axles associated with each beam and concentric with the pivotal axis of each beam and drive means connecting the drive axles to the wheels respectively.

4. A vehicle driving unit comprising a rigid transverse member, equalizing beams pivoted intermediate their ends on the ends of the transverse member, a wheel journaled on each end of each equalizing beam, two concentric drive axles associated with each beam and concentric with the pivotal axis of each beam, a drive shaft, a double differential interposed between the drive shaft and the four drive axles and drive means connecting the drive axles with the respective wheels.

5. A vehicle driving unit comprising an axle housing, equalizing beams pivoted intermediate their ends on the ends of the axle housing, two pairs of concentric drive shafts in said housing, each pair being associated with one of said beams, a drive shaft, differential gearing between the drive shaft and the four axles, wheels journaled on the ends of said beams and drive means connecting the axles with the respective wheels.

6. A vehicle driving unit comprising a hollow equalizing beam pivoted intermediate its ends on a transversely disposed trunnion, spindles rigidly secured at the ends of the beam, wheels journaled on said spindles, axles secured to the wheels and extending into the beam, a pair of concentric drive axles concentric with the trunnion extending into the beam and driving means disposed within the beam and connecting the drive axles with the respective wheel axles.

7. A road vehicle comprising a frame, an equalizing beam arranged on each side of the frame, a rigid transverse member on the ends of which the beams are fulcrumed, springs interposed between the transverse member and the frame, wheels journaled on the ends of the beams, a pair of concentric drive axles concentric with the axis of ful-